United States Patent Office 3,558,663
Patented Jan. 26, 1971

3,558,663
METHOD FOR CATALYTIC DEHYDROGENATION OF 2,3-DIHYDRO INDOLE
Jan Magnus Bakke, Karlskoga, Sweden, assignor to Aktiebolaget Bofors
No Drawing. Filed July 24, 1968, Ser. No. 747,081
Claims priority, application Sweden, Aug. 4, 1967, 11,119/67
Int. Cl. C07d 27/56
U.S. Cl. 260—319.1
1 Claim

ABSTRACT OF THE DISCLOSURE

Indole is prepared by the catalytic dehydrogenation of 2,3-dihydro indole in the presence of a platinum or palladium catalyst in the absence of a hydrogen acceptor.

---

The present invention relates to a method for catalytic dehydrogenation of 2,3-dihydro indole, in order to obtain indole. Several different methods for this dehydrogenation are known, and in some of them, catalysts based upon copper and/or chromium are used. These methods, which are carried out at high temperatures and in a gas phase, however, are rather complicated to carry out and, moreover, give low yields of indole. In other, previously known methods, precious metal catalysts are used, which then must be combined with appropriate hydrogen acceptors, such as cinnamic acid or maleic acid anhydride. The necessity of having to use hydrogen acceptors in these methods of course involves extra costs, and also involves a great deal of processing problems, as the indole must be separated from the hydrogenated acceptor.

Through the present invention, catalytic dehydrogenation of 2,3-dihydro indole has become possible, with a good yield of indole, without the above-mentioned disadvantages. The method is characterized according to the present invention in that the reaction takes place with the use of a precious metal catalyst, but without the presence of a hydrogen acceptor, and takes place in an inert organic solvent at a temperature of between 50° C. and 250° C., particularly between 100° C. and 150° C. As an inert organic solvent, e.g. toluene, xylene or benzene can be used. The precious metal catalyst can for instance consist of palladium on active carbon or platinum oxide.

Tests made have shown that the hydrogen leaves the reaction mixture in a gaseous form, and in a quantity which closely conforms to what was theoretically expected, and this thus shows that no hydrogen acceptor participates in the reaction.

The invention will now be described in more detail with reference to the following examples.

EXAMPLE 1

1.0 g. of 2,3-dihydro indole and 0.1 g. of a catalyst consisting of 10% palladium on active carbon was mixed with 50 ml. of toluene, and the mixture was refluxed for 1½ hours. The reaction temperature thereby came to be at approx.110° C. Through thin-layer chromatographic analysis of the solution, it was established that this only contained indole. The boiling was then continued for a further ½ hour, after which the catalyst was filtered off and the toluene separated through evaporation. A residue having a weight of 1.0 g. was then obtained, which as regards both the thin-layer chromatogramme and the I.R. spectrum was identical to indole.

EXAMPLE 2

259.8 mg. of 2,3-dihydro indole and 20 mg. of catalyst consisting of 10% palladium on active carbon was mixed with 100 ml. of toluene, and the mixture was refluxed. The reaction was carried out in such a way that the gas produced could be measured. During the course of 47 minutes, 43.0 ml. of gas (converted to 0° C. and 760 mm. Hg.) was produced, and this corresponds to 88% of the development of gas could be expected theoretically at dehydrogenation of 259.8 mg. of 2,3-dihydro indole. The test shows that the released hydrogen leaves in a gaseous form, and that thus no hydrogen acceptor participates in the reaction.

EXAMPLE 3

1.0 g. of 2,3-dihydro indole and 0.1 g. of platinum oxide was added to 50 ml. of toluene, and the mixture was refluxed for 1½ hours. Through thin-layer chromatographic analysis, it was established that there was still 2,3-dihydro indole present in the reaction mixture. The test thus shows that the reaction takes place more slowly with platinum oxide as a catalyst than with palladium on active carbon.

EXAMPLE 4

1.0 g. of 2,3-dihydro indole and 0.1 g. of copper chromite was added to 50 ml. of toluene, and the mixture was refluxed for 1½ hours. Through thin-layer chromatographic analysis it was established that the reaction mixture only contained traces of indole. The test thus shows that copper chromite cannot be used as a catalyst in this connection.

EXAMPLE 5

1.0 g. of 2,3-dihydro indole and 0.1 g. of catalyst consisting of 10% palladium on active carbon was added to 50 ml. of xylene and the mixture was refluexed for 2 hours. This involves that the reaction temperature was at approx. 140° C. The reaction mixture was processed in the same way as per Example 1, and a residue of 0.98 g. was then obtained. According to both the thin-layer chromatogramme and the I.R. spectrum, this residue proved to be identical to indole.

EXAMPLE 6

1.0 g. of 2,3-dihydro indole and 0.1 g. of catalyst consisting of 10% palladium on active carbon was added to 50 ml. of benzene and the reaction mixture was placed with stirring at 20° C. for 18 hours. Through thin-layer chromatographic analysis it proved that the reaction mixture only contained unconverted 2,3-dihydro indole. The reaction mixture was then heated to refluxing, which involves a reaction temperature of approx. 80° C., and was thereafter allowed to reflux for 4½ hours. Thin-layer chromatographic analysis of the reaction mixture then showed that indole was formed, but that there was still 2,3-dihydro indole present.

The same test was repeated but with the difference that oxygen was allowed to flow through the reaction mixture. The result was identical in all respects to the foregoing test, and shows that oxygen obviously has no substantial influence on the reaction process.

I claim:
1. A method of preparing indole from 2,3-dihydroindole by catalytic dehydrogenation which comprises heating 2,3-dihydroindole in an inert organic solvent at a temperature from about 50 to 250° C. in the absence of a hydrogen acceptor and in the presence of a catalyst selected from the group consisting of palladium on active carbon and platinum oxide.

2. A method according to claim 1 wherein the inert solvent is benzene, toluene or xylene.

3. A method according to claim 2 wherein the temperature is from about 100 to 150° C.

References Cited

Jansen et al.: Chem. Abs. 63: 1763 (1965).
Lesiak: Chem. Abs. 61: 9457 (1964).

ALEX MAZEL, Primary Examiner

J. A. NARCAVAGE, Assistant Examiner

UNITED STATES PATENT OFFICE
CERTIFICATE OF CORRECTION

Patent No. 3,558,663          Dated January 26, 1971

Inventor(s) Jan Magnus Bakke

It is certified that error appears in the above-identified patent and that said Letters Patent are hereby corrected as shown below:

In the heading to the printed specification, line 10, "1 Claim" should read -- 3 Claims --.

Signed and sealed this 25th day of May 1971.

(SEAL)
Attest:

EDWARD M. FLETCHER, JR.          WILLIAM E. SCHUYLER, JR.
Attesting Officer          Commissioner of Patents